2,989,501
BISPHENOL POLYOXALATES

Gelu Stoeff Stamatoff, Newark, Del., assignor to E. I. du Pont de Nemours and Company, Wilmington, Del., a corporation of Delaware
No Drawing. Filed Feb. 27, 1958, Ser. No. 717,846
3 Claims. (Cl. 260—47)

This invention relates to improvements in processes for manufacturing bisphenol polyoxalates, and particularly to an improved bis(4-hydroxyphenyl)-2,2-propane polyoxalate composition having physical properties superior to those of related polyoxalate compositions heretofore dicslosed.

Polyesters of bis(4-hydroxyphenyl) alkanes were first prepared by Wagner, U.S. Patent 2,035,578, who made these resinous reaction products by heating diacid chlorides with bis(4-hydroxyphenyl) alkanes in the presence of alkaline acceptors. In the Wagner process, the toughness of the resinous product could be controlled by various methods, especially by selection of the appropriate polybasic acid halide; for example, aliphatic polybasic acid chlorides gave tougher products when —COCl groups were separated by relatively long aliphatic chains. Moreover, the present applicant has confirmed the fact that under conditions which, with other diacyl halides, generally produce polyesters of relatively higher intrinsic viscosity, the Wagner process, using oxalyl chloride as the polybasic acid halide yields polyoxalates having inherent viscosities not exceeding 0.2. The other physical properties of said polyoxalates are correspondingly poorer than those of the polyoxalates hereinafter described.

An object of this invention is to prepare improved polyoxalate esters of bis(4-hydroxyphenyl)-2,2-propane. Other objects of the invention will appear hereinafter.

It has been discovered in accordance with this invention that polyoxalate esters which differ from those obtainable by processes heretofore known can be obtained by reaction between bis(4-hydroxyphenyl)-2,2-propane and (—COOR)$_2$, wherein R is a monocyclic aryl radical, if the polyesterification reaction is performed in the manner to be described below.

More particularly, it has been discovered that the reaction proceeds satisfactorily at temperatures high enough for complete removal of the ROH product, but that further heating is needed to improve the quality of the product. In general, the polymer prior to final heating is a chloroform-insoluble polyester of rather high melting point (above 300° C.), which can be toughened and converted to a chloroform-soluble product by further heating with consequent lowering of the softening point. The final heating is carried out at a temperature above 250°, suitably about 250° to 325° C. Metal oxides or salts thereof may be employed as esterification catalysts if desired, but such catalysts are not needed. The presence of these catalysts permits lowering of the reaction temperature with the ranges specified to obtain results obtainable noncatalytically at higher temperatures within said range. The inherent viscosities of the final products obtained as abovedescribed are generally within the range of about 0.4 to 1.0 (measured in chloroform at 0.5% concentration at 35° C.).

Preferably the reaction is conducted in the presence of an added liquid diluent such as an inert hydrocarbon, aryl chloride, or a phenolic compound.

Combinations of the bisphenol reactant with a glycol reactant may be used with quite satisfactory results, when relatively lower melting products are desired.

The invention is illustrated further by means of the following examples.

EXAMPLE I

A mixture consisting of 18.445 grams diphenyl oxalate, 17.350 grams bis(4-hydroxyphenyl)-2,2-propane and 50 cc. o-dichlorobenzene was flash distilled for removal of cresol and solvent after which the residue, with 150 cc. of additional dichlorobenzene was placed in a still equipped with an efficient column, and distillation was continued until the pot temperature reached 210° to 220° C. The resulting mixture, which at this stage was not readily soluble in chloroform, and which evidently did not wet glass unless heated to a temperature of about 300° C., was placed in a polymerization vessel, with 0.01 gram Zn(Ac)$_2$·2H$_2$O, and was heated in a vapor bath at 254° C. in a stream of N$_2$ and finally at a pressure of 0.5 mm. for 4½ hours. The resulting resin was a clear viscous transparent melt, which was too viscous to stir at 254° C. and which was capable of wetting glass at that temperature. Moreover, the product was now readily soluble in chloroform. This resin had an inherent viscosity of 0.63, measured at 0.5% concentration in chloroform at 35° C. Tinius-Olsen stiffness measurements were made on films molded from this resin with the following results:

*Stiffness of films bis(4-hydroxyphenyl)-2,2-propane polyoxalate*

| Temperature,° C. | Stiffness (Pounds per sq. inch) |
|---|---|
| 25 | 400,000. |
| 50 | 350,000. |
| 75 | 343,000. |
| 100 | 315,000. |
| 125 | 307,000. |
| 150 | 274,000. |
| 175 | 158,000. |
| 200 | Not measurable. |

These stiffness measurements were quite similar to those of the corresponding polycarbonate, except at temperatures above 125°–150° C., the polyoxalate being far stiffer than the polycarbonate at the 150°–200° C. level.

EXAMPLE II

A mixture consisting of 13.51 grams dicresyl oxalate, 11.41 grams bis(4-hydroxyphenyl)-2,2-propane, 10 cc. cresol and 0.001 gram copper resinate (as a color inhibitor), was heated in a test tube at 218° with N$_2$ passing over the reaction mixture. After 170 minutes the mixture was fairly viscous. Pressure was then lowered to 0.5 mm., and heating was continued for 37 minutes. The vessel was then moved to a 254° C. vapor bath and heating was continued for 23 minutes. Finally, the mixture was heated at 277° for 75 minutes. The resulting viscous melt was then cooled. It had an intrinsic viscosity of 0.51, measured at 0.5% concentartion in chloroform. The melt could be drawn into a fiber which solidifies as it is drawn.

EXAMPLE III

A mixture consisting of 20.56 grams (0.075 mol) dicresyl oxalate, 11.41 grams bis(4-hydroxyphenyl)-2,2-propane (0.05 mol), 2.604 grams of neopentyl glycol (0.025 mol), and 100 cc. decahydronaphthylene was placed in a 250 cc. flask equipped with a distillation column. Distillation was continued for 1¼ hours at a distillation temperature of 95° to 98° C. The mixture was then transferred to a polymerization vessel in which it was heated in a nitrogen atmosphere at 218° C. for 115 minutes, followed by heating at 218° C. for 130 minutes at a pressure of 0.3 mm. Finally, the mixture was heated for 150 minutes at 254° under a pressure of 0.3 mm. The resulting product was removed from the vessel and cooled. It was a clear resin which softened when heated to 170° C., at which temperature it could be molded. It had an inherent viscosity of 0.434, measured in chloroform at 0.5% concentration.

EXAMPLE IV

A mixture consisting of 13.51 grams dicresyl oxalate and 17.4 bis(4-hydrophenyl)-2,2-propane was placed in a reaction vessel and was maintained at a pressure of .5 to .3 mm. for 15 minutes, followed by introduction of $N_2$. Pressure was then lowered to 120 mm., and temperature was raised to 202°. After 40 minutes, temperature was raised to 254° and the heating was continued at 120 mm. for 70 minutes. For final heating and toughening the mixture was heated at 277° for 65 minutes at 0.5 mm. pressure. The resulting product had an inherent viscosity (in $CHCl_3$ at 35°, 0.5% concentration) of 0.67.

The products hereinabove described are highly useful in the production of molded articles, decorative objects and the like. They are well adapted for injection molding operations.

What is claimed is the following:

1. A novel bis(4-hydroxyphenyl)-2,2-propane polyoxalate, characterized in that it has an inherent viscosity in the range of 0.4 to 1.0, measured in chloroform at 0.5% concentration at 35° C., and is obtained by heating bis(4-hydroxyphenyl)-2,2-propane with a diaryl oxalate of the formula $(COOR)_2$ in equimolal proportions, R being a monocyclic aryl hydrocarbon radical, until all of the resulting phenol of the formula ROH is removed from the system, followed by further heating the resultant polyoxalate at a temperature of 250° to 325° C. until a chloroform-soluble product is obtained.
2. Composition of claim 1 in the form of film.
3. Composition of claim 1 in the form of fiber.

References Cited in the file of this patent

UNITED STATES PATENTS

| | | |
|---|---|---|
| 2,035,578 | Wagner | Mar. 31, 1936 |
| 2,477,306 | Lieber | July 26, 1949 |

FOREIGN PATENTS

| | | |
|---|---|---|
| 621,102 | Great Britain | Mar. 25, 1949 |